(12) United States Patent
Bok et al.

(10) Patent No.: US 7,770,836 B2
(45) Date of Patent: Aug. 10, 2010

(54) LOCKING UNIT FOR SEAT BELT RETRACTOR

(75) Inventors: Chang Kyu Bok, Gwangmyeong-si (KR); Gi Young Bae, Wonju-si (KR); Byung Jin Lee, Daegu (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 12/323,847

(22) Filed: Nov. 26, 2008

(65) Prior Publication Data
US 2009/0189006 A1    Jul. 30, 2009

(30) Foreign Application Priority Data
Jan. 28, 2008    (KR) ...................... 10-2008-0008456

(51) Int. Cl.
*B60R 22/38*    (2006.01)
(52) U.S. Cl. ..................... 242/383; 242/383.1
(58) Field of Classification Search ................. 242/383, 242/383.1–383.5, 384, 384.1–384.3
See application file for complete search history.

(56) References Cited

U.S. PATENT DOCUMENTS

| 3,294,446 | A | * | 12/1966 | Fontaine | ...................... 297/477 |
| 3,711,037 | A | * | 1/1973 | Jakob | ...................... 242/383.1 |
| RE29,594 | E | | 3/1978 | Takada et al. | |
| 4,429,841 | A | * | 2/1984 | Kassai | ...................... 242/383.4 |
| 4,768,733 | A | * | 9/1988 | Willey | ...................... 242/383 |
| 5,072,968 | A | * | 12/1991 | Hamaue | ...................... 280/806 |
| 6,290,160 | B1 | * | 9/2001 | Strobel | ...................... 242/383 |
| 2003/0189121 | A1 | * | 10/2003 | Smithson et al. | ............ 242/383 |

* cited by examiner

*Primary Examiner*—Sang Kim
(74) *Attorney, Agent, or Firm*—Morgan, Lewis & Bockius LLP

(57) ABSTRACT

The present invention provides a locking unit for a seat belt retractor which is provided on one end of a spool, around which a seat belt is wound. The locking unit of the present invention locks the seat belt when the seat belt is rapidly unwound and prevents the seat belt from being locked when it is retracted. The locking unit includes a locking arm, a central gear, which is unrotatably provided on the center of the spool, an actuating gear, and a locking pin, which stops a locking protrusion of the locking arm when the belt is retracted.

10 Claims, 6 Drawing Sheets

FIG. 2A *(Prior Art)*
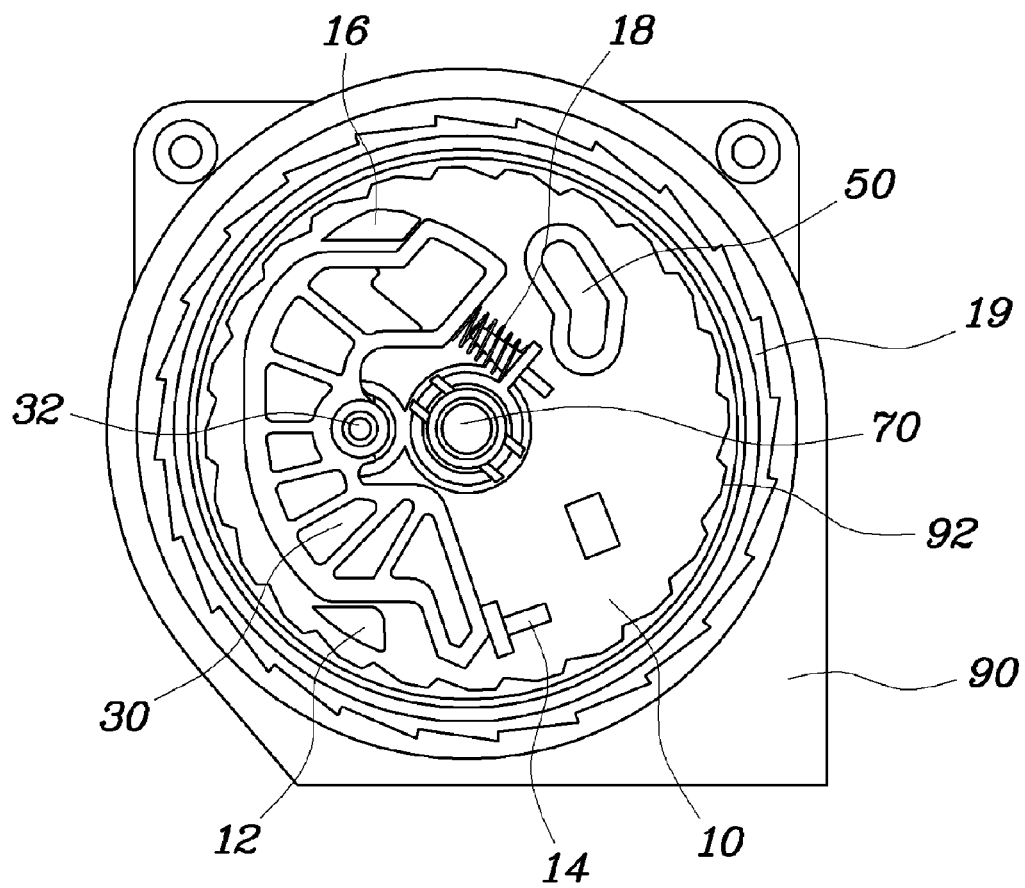

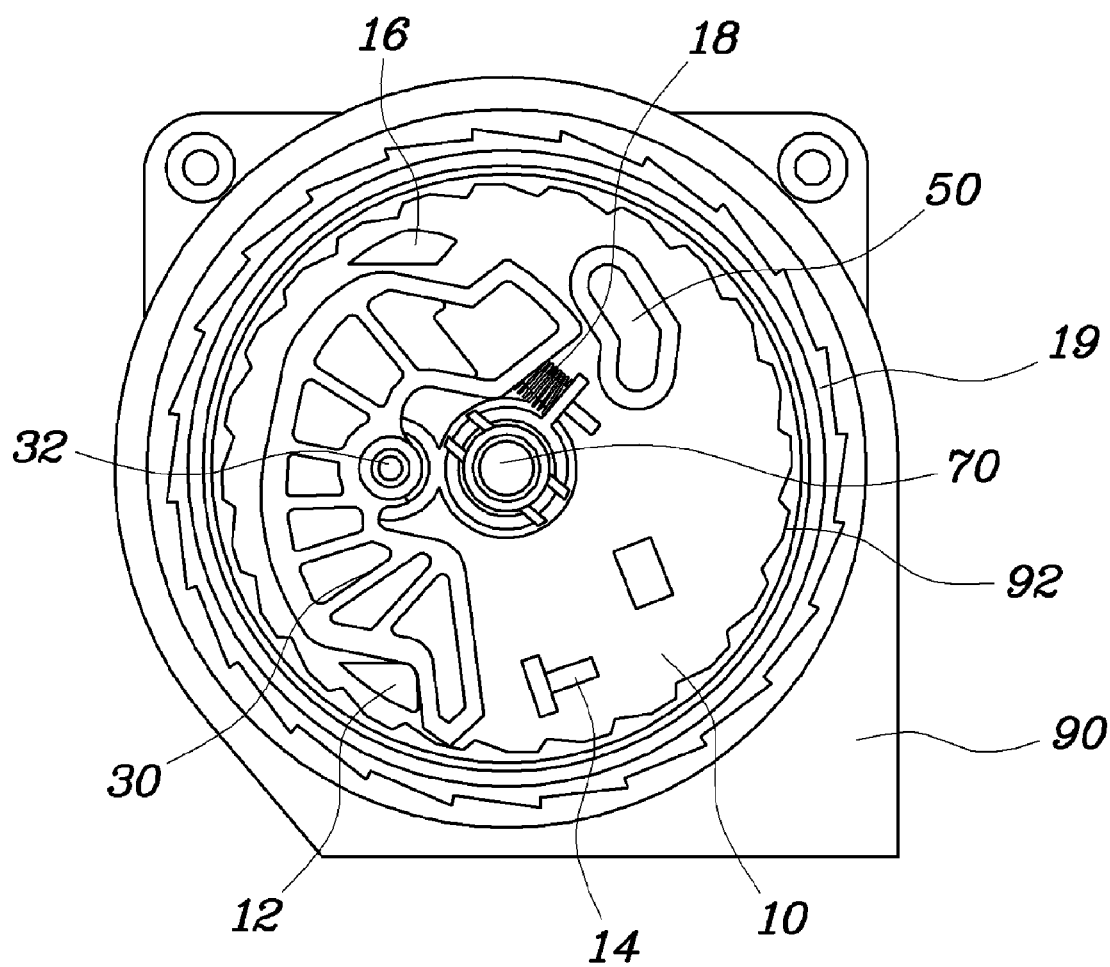
FIG. 2B *(Prior Art)*

LOCKING UNIT FOR SEAT BELT RETRACTOR

CROSS-REFERENCE TO RELATED APPLICATIONS

This application claims priority to Korean Application No. 10-2008-0008456, filed on Jan. 28, 2008, the disclosure of which is incorporated herein by reference.

BACKGROUND OF THE INVENTION (1) Field of the Invention

The present invention relates to a locking unit, and more particularly, a locking unit for a seat belt retractor which is provided on one end of a spool around which a seat belt is wound, and which is constructed such that, when the seat belt is rapidly unwound, for example, when a vehicle collision occurs, a locking part of the locking arm, a rotating center of which is disposed away from the center axis of the spool, is locked to an internal gear, thus locking the seat belt.

(2) Description of the Related Art

Generally, as seat belt systems for vehicles, three-point seat belt systems, in which first and second portions of a seat belt are respectively coupled to upper and lower ends of a pillar panel in a passenger compartment, and which are constructed such that a passenger pulls a third portion of the seat belt and fastens it to a predetermined portion of the seat, have been widely used. In such a three-point seat belt system, a spool is provided in the upper end of the pillar panel, and a retractor is provided to make it possible to wind the seat belt on the spool. Furthermore, a height adjustment unit for adjusting the height of the spool is provided in the seat belt system, so that the passenger can adjust the height of the spool to correspond to his/her sitting height.

Meanwhile, when a vehicle collision occurs, the passenger leans forwards due to inertia. At this time, to protect the upper body of the passenger, the seat belt must instantaneously lock in response to the collision. As well as in the event of such a collision, this function must also be conducted when the vehicle stops suddenly. To achieve the above-mentioned purpose, a locking unit of a retractor is provided in the spool of the vehicle seat belt system. The locking unit serves as a safety device for holding the spool such that, when the seat belt is rapidly unwound, the spool is prevented from rotating.

A conventional seat belt 1 and a locking unit therefore will be explained with reference to FIGS. 1 and 2. In the seat belt 1, which is a three-point type, a spool 10 is provided in the upper end of a pillar panel. The height of the spool 10 is adjusted by pushing and moving a height adjustment unit 3 upwards or downwards such that a member 5, in which the spool is installed, is moved upwards or downwards.

A locking unit of a retractor is provided on one end of the spool 10. The locking unit has an external gear 19 on the circumferential outer surface thereof. Furthermore, a locking arm 30 is provided on a shaft 32, which is disposed away from the rotating center 70 of the spool 10 in a predetermined distance. A protrusion type locking part is provided on a first end of the locking arm 30. A front stopper 12 and a rear stopper 14 are provided to define the range within which the locking part can move, wherein the protrusion type locking part is disposed between the front stopper 12 and the rear stopper 14. A second end of the locking arm 30 is supported by a spring 18 and is stopped at a predetermined position by another stopper 16. In addition, an inertia actuating member 50 is provided adjacent to the second end of the locking arm 30 to prevent the locking arm 30 from rotating when the belt is rapidly unwound. An internal gear 92, to which the protrusion type locking part of the locking arm 30 is locked by inertia, is provided in the locking unit. The internal gear 92 is fixed to a housing 90, so that, when the belt is wound or unwound, the spool 10 is rotated inside the housing 90, but the internal gear 92 maintains the stationary state.

FI. 2A is a view showing the locking unit under normal conditions. FIG. 2B is a view showing the locking unit when it is in a locked state. As shown in the drawings, when the belt 1 is unwound, the spool 10 is rotated in a counterclockwise direction. At this time, the locking part of the locking arm 30 is not locked to the internal gear 92. The spool 10 is rotated in the housing 90. Meanwhile, when the belt 1 is rapidly unwound, the spool 10 is rapidly rotated in a counterclockwise direction. Simultaneously, the locking arm 30 is rotated in a clockwise direction by inertia, so that the locking part of the locking arm 30 is locked to the internal gear 92. At this time, the front stopper 12 attached on the spool 10 stops the rotation of the locking arm 30. Thus, the spool 10 can no longer rotate. Using this method, when the vehicle stops suddenly or is in a collision, the spool 10 is locked and is prevented from rotating, thus preventing the belt 1 from being unwound, thereby protecting the passenger.

However, in the case of the conventional locking unit for the seat belt retractor, the locking arm is rotated by inertia not only when the belt is rapidly unwound but also when the belt is rapidly wound, in which case the belt is undesirably locked. This is called an end lock phenomenon. The end lock phenomenon occurs when the belt is wound or the height adjustment unit is rapidly moved downwards. In detail, when the belt is wound, the retractor rapidly winds the belt around the spool. When the retraction of the belt is completed, that is, when the spool, which has been rotated, is stopped, the locking arm is rotated by inertia and is thus locked to the internal gear. In the case where the height adjustment unit is rapidly moved downwards, the belt is wound by the retractor to a length corresponding to the distance that the spool is moved downwards. At this time, the above-mentioned end lock phenomenon occurs. As such, the conventional locking unit for the retractor is a safety device to ensure readiness for the case where the belt is rapidly unwound, but there is a problem in that the belt is also locked when the belt is rapidly wound, which is undesirable in that it inconveniences the user and parts thereof may be damaged.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, embodiments of the present invention have been made keeping in mind the above problems occurring in the prior art, and an object of the present invention is to provide a locking unit for seat belt retractors which prevents a seat belt from being undesirably locked when the seat belt is wound, thus being more convenient for a user, and preventing parts thereof from being damaged.

In order to accomplish the above object, the present invention, as an exemplary embodiment, provides a locking arm provided with a locking part on a first end thereof and with a locking protrusion on a second end thereof, wherein the locking arm is pivotally mounted on the spool; a central gear provided on the center of the spool, the central gear being stationary; and an actuating gear rotatably mounted on the spool and engaging with the central gear so that the actuating gear is rotated around the central gear by rotation of the spool and is rotated around a center thereof, and locking pin parts provided on a rotating shaft of the actuating gear and selectively restricting rotation of the locking protrusion such that a constant frictional force is maintained between the locking pin parts and the actuating gear, and the actuating gear and the locking pin parts stop the locking protrusion when the belt is retracted, thus preventing the locking of the belt. A friction spring or a fluid friction plate may be interposed between the locking pin parts and the actuating gear to maintain the frictional force therebetween. The internal gear and the central gear may be fastened to a housing for covering the spool.

In another exemplary embodiment of the present invention the locking pin parts may comprise a first locking pin extending in a predetermined length from the rotating shaft of the actuating gear toward the second end of the rocking arm and, wherein, when the belt is unwound, the first locking pin moves inward the locking arm to prevent the locking pin from stopping the locking protrusion. The locking pin parts may further comprise a second locking pin wherein the second locking pins extends in a predetermined length towards the first end of the locking arm and restricts rotation scope of the first locking pin. A friction spring or a fluid friction plate may be interposed between the locking pin parts and the actuating gear to maintain the frictional force therebetween. The internal gear and the central gear may be fastened to a housing for covering the spool.

In further another exemplary embodiment of the present invention, the locking pin parts may comprise a first locking pin and a second locking pin wherein the first and second locking pins extends in a predetermined length respectively from the rotating shaft of the actuating gear in opposite directions with respect to a central line connecting the centers of the central gear and the actuating gear, wherein, when the belt is unwound, the first locking pin moves inward the locking arm to prevent the locking pin from stopping the locking protrusion. A friction spring or a fluid friction plate may be interposed between the locking pin parts and the actuating gear to maintain the Frictional force therebetween. The internal gear and the central gear may be fastened to a housing for covering the spool.

In another exemplary embodiment of the present invention, the locking part of the locking arm may be disposed between a first stopper and a second stopper and the locking protrusion may be disposed between a stopper and an inertia actuating member, wherein the first and second stoppers, the stopper, and the inertia actuating member are integrally mounted on the spool.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIG. 2A is a view showing an unlocked state of a locking unit for seat belt retractors according to the conventional technique;

FIG. 2B is a view showing the locking unit of FIG. 2A, which is in a locked state;

Figure 1:
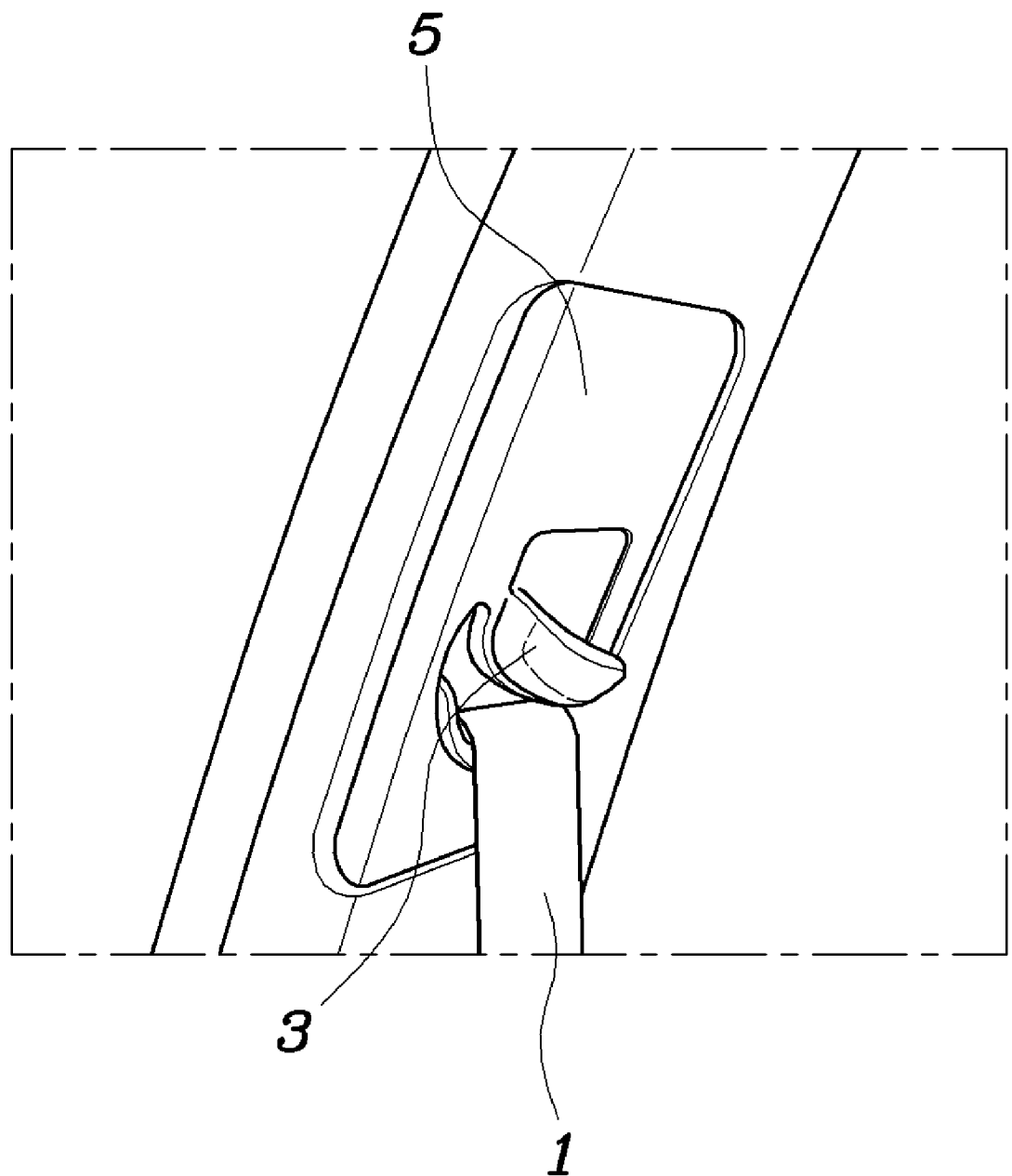
FIG. 1 is a perspective view showing a height adjustment unit of a seat belt according to a conventional technique.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 3A:
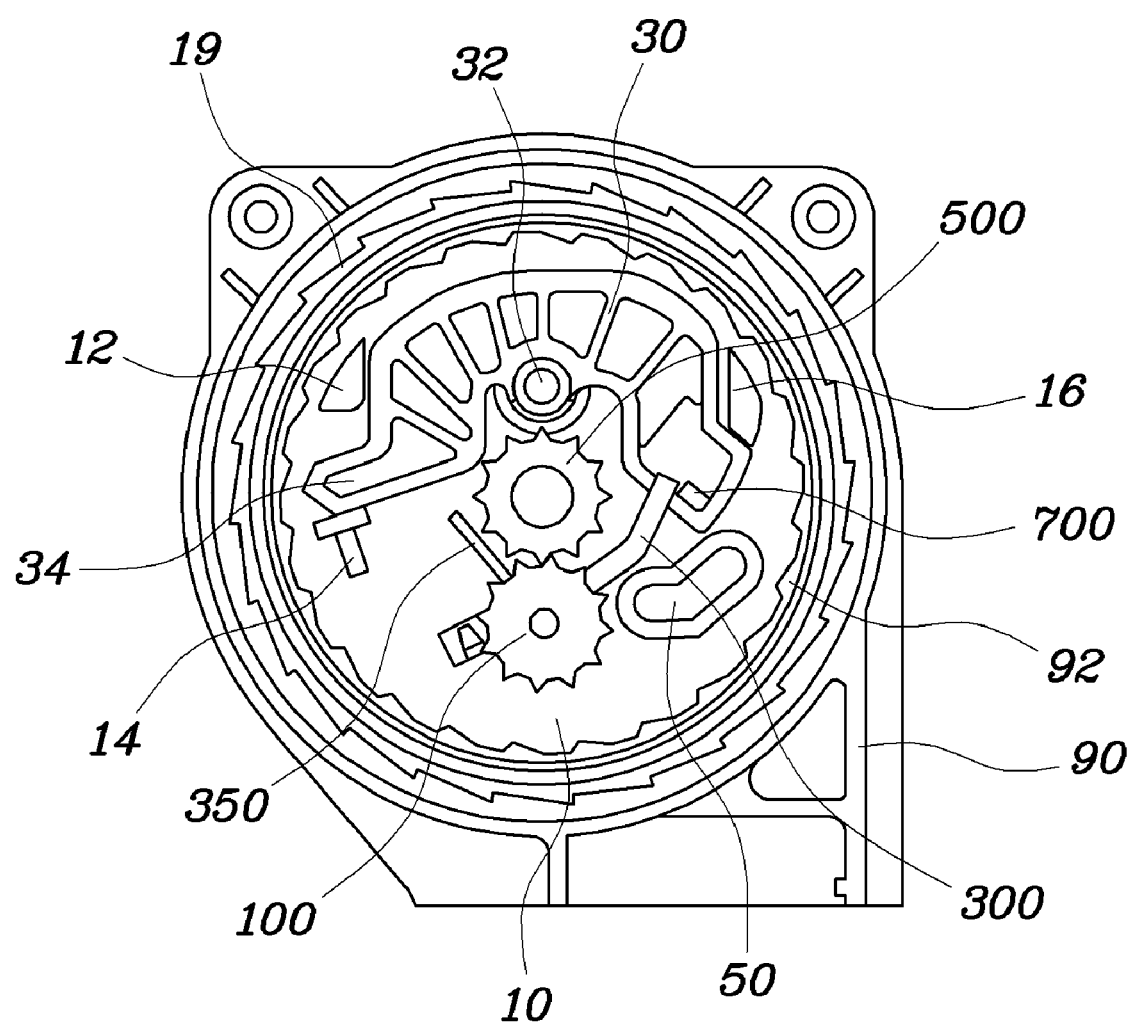
FIG. 3A is a view showing a locking unit for seat belt retractors when not in operation, according to an exemplary embodiment of the present invention.
Figure 3B:
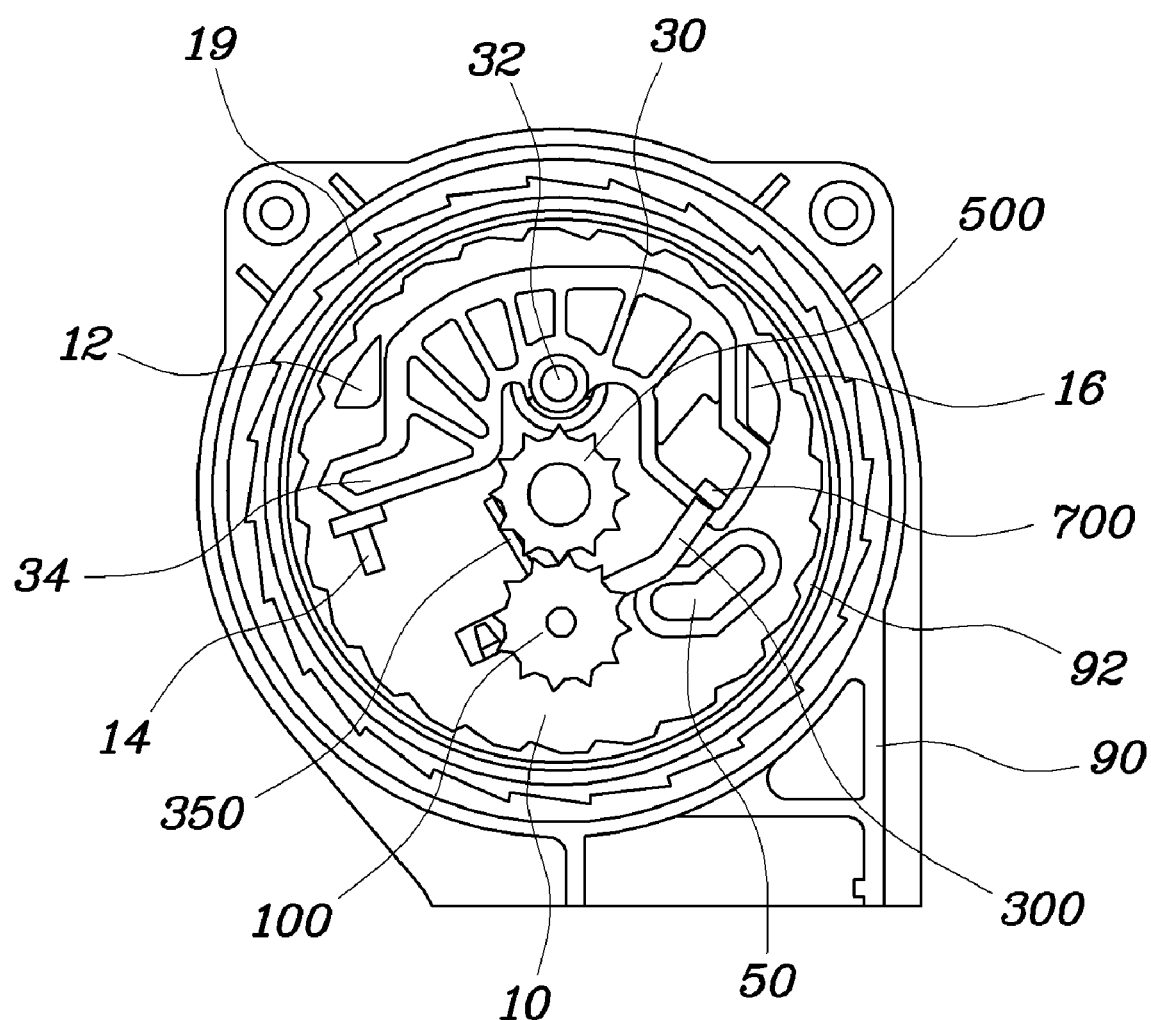
FIG. 3B is a view showing the locking unit of FIG. 3A in operation.

FIGS. 3A and 3B are views showing the locking unit for seat belt retractors according to the embodiment of the present invention when it is not in operation and when it is in operation, respectively.

Referring to the drawings, the locking unit for seat belt retractors includes a locking arm 30 pivotally mounted on a spool 10, wherein the locking arm 30 has a locking part 34 and a locking protrusion 700 on an end thereof opposite the locking part 34, and a central gear 500, which is mounted on the center of the spool 10 and fixed on a housing 90. The locking unit further includes an actuating gear 100, which is offset from the central gear 500 in a predetermined distance and engages with the central gear 500 so that the actuating gear 100 is rotated around the circumference of the central gear 500 by the rotation of the spool 10 and, simultaneously, is rotated around its own center, and locking pin parts, which is provided on a rotating shaft of the actuating gear 100 such that constant frictional force is maintained between the locking pin parts and the actuating gear 100.

The actuating gear 100 and the locking pin parts stop the locking protrusion 700 when a belt 1 is retracted, that is, when it is wound, thus preventing the belt from entering the locked state as explained in detail hereinafter.

The locking pin parts comprise a first locking pin 300 and a second locking pin 350. In an exemplary embodiment of the present invention, the first and second locking pins 300 and 350 extend in a predetermined length from the rotating shaft of the actuating gear 100 in opposite directions respectively with respect to the center line connecting the centers of the actuating gear 100 and the central gear 500 and is constructed such that, when the belt is unwound, the first locking pin 300 rotates counterclockwise to be positioned inward the locking arm 30 to prevent it from stopping the locking protrusion 700 as shown in FIG. 3B.

The state of the locking unit when not in operation will be explained herein below with reference to FIG. 3A. The term "the state of the locking unit when not in operation" means the state of the locking unit under normal conditions or the state thereof when the belt 1 is unwound. An internal gear 92 and the central gear 50 are unrotatably provided in a housing 90. The actuating gear 100 is rotatably coupled at a predetermined position to the spool 10 by a hinge. The actuating gear 100 revolves around the center of the spool 10 by rotation of the spool 10 and, simultaneously, rotates around its own center because it engages with the central gear 500.

When the belt is unwound the spool 10 is rotated in a counterclockwise direction, and the actuating gear 100 is also rotated in a counterclockwise direction along the circumference of the central gear 500 as shown in FIG. 3A. At this time, the first locking pin 300 rotates in the counterclockwise direction according to rotation of the actuating gear 100 and thus moves inward the locking arm 30 to prevent it from interfering with the locking protrusion 700. Therefore, in this case, the operation of locking the locking arm 30 in the event of rapid deceleration or a collision can be conducted without hindrance. In other words, the locking unit can serve as a safety device in the same manner as that of the conventional technique.

The state of the locking unit when in operation will be explained herein below with reference to FIG. 3B. The term "the state of the locking unit when in operation" means the state of the locking unit when the belt 1 is wound.

When the belt I is wound, the spool 10 is rotated in a clockwise direction, and the actuating gear 100 is also rotated in a clockwise direction along the circumference of the central gear 500. At this time, the locking pin parts comprising the first locking pin 300 and the second locking pin 350 also rotate in a clockwise direction due to friction between the locking pin parts and the actuating gear 100 and thus the first locking pin 300 comes into contact with the locking protrusion 700, thus stopping the locking protrusion 700. Here, an inertial actuating member 50 serves as a stopper for the locking pin parts such that the first locking pin 300 corresponds to the locking protrusion 700. Therefore, the locking protrusion 700 is stopped by the first locking pin 300, so that the locking arm 30 is prevented from being rotated by inertia. Thus, the locking part 34 is prevented from being locked to the internal gear 92. Furthermore, when the belt is unwound again after having been wound, the first locking pin 300 is removed from the locking protrusion 700, so that the locking arm 30 enters the state in which it can be locked to the internal gear 92 without restriction.

The second locking pin 350 restricts the scope of rotation of the first locking pin 300 so that the first locking pin 300 may come into contact with the locking protrusion 700 when the belt 1 is wound.

Figure 4:
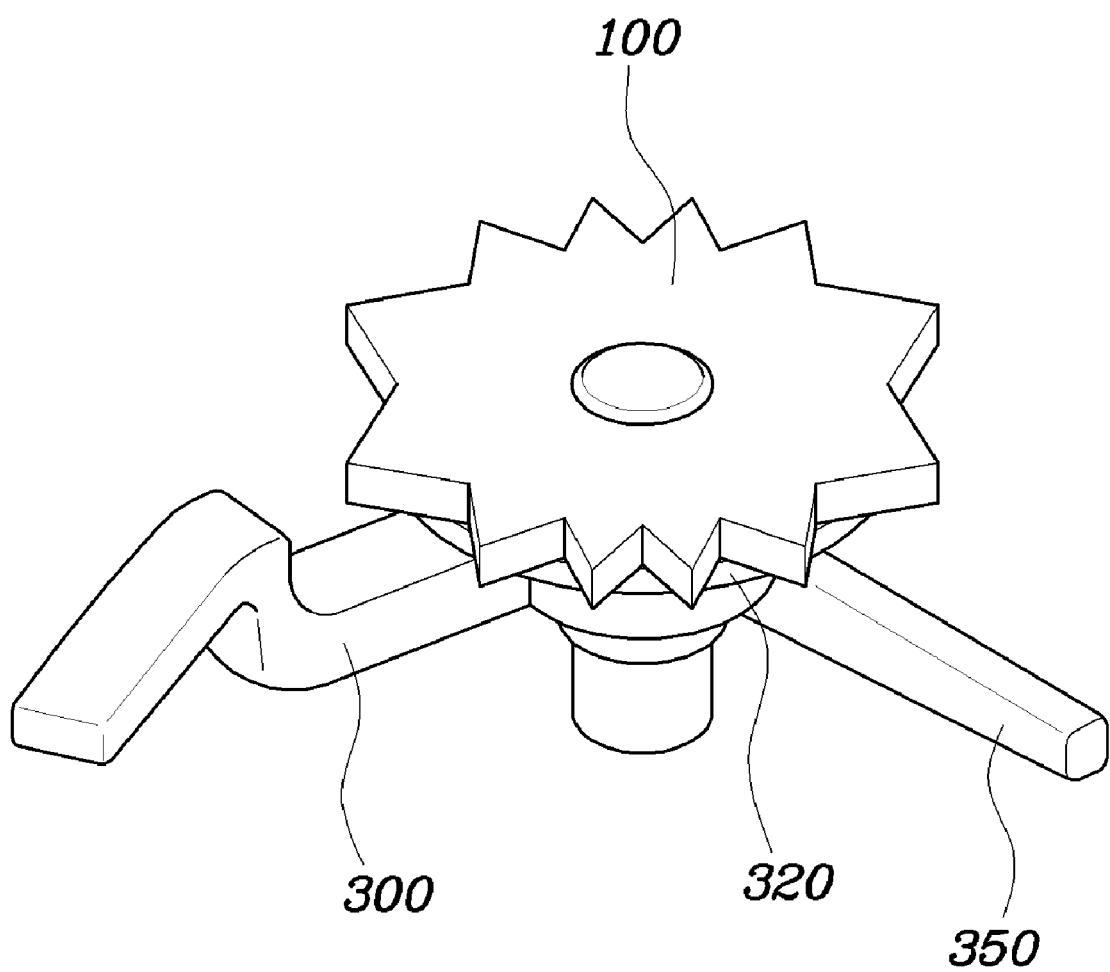
FIG. 4 is a perspective view showing critical parts of the locking unit for seat belt retractors according to the exemplary embodiment of the present invention.

The actuating gear 100 and the locking pin parts will be explained in more detail with reference to FIG. 4. The actuating gear 100 and the locking pin parts comprising the first locking pin 300 and the second locking pin 350 are fitted over the same shaft. Preferably, a friction spring or a fluid friction plate 320 is interposed between the actuating gear 100 and the locking pin parts to maintain constant frictional force therebetween.

In the present invention having the above-mentioned construction, when the belt is wound, the locking is prevented, and a phenomenon in which the belt is locked when the belt is unwound again after being rapidly wound is prevented.

As described above, in a locking unit for a seat belt retractor according to the present invention, a seat belt is prevented from being undesirably locked when the seat belt is rapidly retracted, thus preventing a malfunction in which the seat belt is locked when it is not desired. Therefore, the present invention can overcome the inconvenience to a user attributable to the phenomenon in which the seat belt is undesirably locked when it is unwound again after being retracted. Furthermore, parts pertaining to the seat belt can be protected from damage due to excessive force.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A locking unit for a seat belt retractor which is provided on one end of a spool, around which a belt is wound, such that, when the belt is rapidly unwound, a locking part of a locking arm, which is disposed away from a center of the spool in a predetermined distance, is locked to an internal gear, thus locking the belt, the locking unit comprising:

the locking arm provided with the locking part on a first end thereof and with a locking protrusion on a second end thereof, wherein the locking arm is pivotally mounted on the spool;

a central gear provided on the center of the spool, the central gear being stationary, and an actuating gear rotatably mounted on the spool and engaging with the central gear so that the actuating gear is rotated around the central gear by rotation of the spool and is rotated around a center thereof; and locking pin parts provided on a rotating shaft of the actuating gear and selectively restricting rotation of the locking protrusion such that a constant frictional force is maintained between the locking pin parts and the actuating gear, and the actuating gear and the locking pin parts stop the locking protrusion when the belt is retracted, thus preventing the locking of the belt.

2. The locking unit as set forth in claim 1, wherein a friction spring or a fluid friction plate is interposed between the locking pin parts and the actuating gear to maintain the frictional force therebetween.

3. The locking unit as set forth in claim 1, wherein the internal gear and the central gear are fastened to a housing for covering the spool.

4. The locking unit as set forth in claim 1, wherein the locking pin parts comprises a first locking pin extending in a predetermined length from the rotating shaft of the actuating gear toward the second end of the locking arm and, wherein, when the belt is unwound, the first locking pin moves inward the locking arm to prevent the locking pin from stopping the locking protrusion.

5. The locking unit as set forth in claim 4, wherein the locking pin parts further comprises a second locking pin wherein the second locking pins extends in a predetermined length towards the first end of the locking arm and restricts rotation scope of the first locking pin.

6. The locking unit as set forth in claim 4, wherein a friction spring or a fluid friction plate is interposed between the locking pin parts and the actuating gear to maintain the frictional force therebetween.

7. The locking unit as set forth in claim 4, wherein the internal gear and the central gear are fastened to a housing for covering the spool.

8. The locking unit as set forth in claim 1, wherein the locking pin parts comprises a first locking pin and a second locking pin wherein the first and second locking pins extends in a predetermined length respectively from the rotating shaft of the actuating gear in opposite directions with respect to a central line connecting the centers of the central gear and the actuating gear, wherein, when the belt is unwound, the first locking pin moves inward the locking arm to prevent the locking pin from stopping the locking protrusion.

9. The locking unit as set forth in claim 8, wherein a friction spring or a fluid friction plate is interposed between the locking pin parts and the actuating gear to maintain the frictional force therebetween.

10. The locking unit as set forth in claim 8, wherein the internal gear and the central gear are fastened to a housing for covering the spool.

* * * * *